US005818735A

United States Patent [19]

Tigwell et al.

[11] Patent Number: 5,818,735

[45] Date of Patent: Oct. 6, 1998

[54] METHOD AND SYSTEM FOR HIGH RESOLUTION TIME-OF-FLIGHT MEASUREMENTS

[75] Inventors: David C. Tigwell; Athanassios Kontos, both of Houston; Seth Andrew Cocking, Missouri City, all of Tex.

[73] Assignee: Peek Measurement, Inc., Houston, Tex.

[21] Appl. No.: 667,114

[22] Filed: Jun. 20, 1996

[51] Int. Cl.[6] .......... G01F 1/66

[52] U.S. Cl. .......... 364/569; 364/510; 364/576; 73/861.28; 73/861.31

[58] Field of Search .......... 364/569, 570, 364/571.01, 571.02, 575, 576, 509–510; 73/861.28, 861, 27, 861.16, 861.25, 861.05, 194, 861.31; 128/653.1, 660.01, 661.07; 368/120

[56] References Cited

U.S. PATENT DOCUMENTS

| | | | |
|---|---|---|---|
| 3,780,577 | 12/1973 | Brown | 73/194 A |
| 4,011,755 | 3/1977 | Pedersen et al. | 73/194 A |
| 4,232,548 | 11/1980 | Baumoel | 73/861.28 |
| 4,337,667 | 7/1982 | Takada | 73/861.28 |
| 4,527,432 | 7/1985 | Gutterman | 73/861.28 |
| 4,569,599 | 2/1986 | Bolkow et al. | 368/120 |
| 4,633,719 | 1/1987 | Vander Heyden | 73/861.28 |
| 4,663,977 | 5/1987 | Vander Heyden | 73/861.27 |
| 4,787,252 | 11/1988 | Jacobson et al. | 73/861.28 |
| 5,117,698 | 6/1992 | Boumoel | 73/861.28 |
| 5,371,686 | 12/1994 | Nabity et al. | 364/510 |
| 5,462,058 | 10/1995 | Yamada et al. | 128/661.08 |
| 5,499,190 | 3/1996 | Takahashi et al. | 364/481 |
| 5,557,536 | 9/1996 | Nabity et al. | 364/510 |

*Primary Examiner*—James P. Trammell
*Assistant Examiner*—Bryan Bui
*Attorney, Agent, or Firm*—Fulbright & Jaworski L.L.P.

[57] ABSTRACT

A method and system of measuring the differential time of flight of a signal transmitted between first and second transducers. First, multiple broadband signal pulses are transmitted in a first direction by the first transducer and received by the second transducer. Then, the received pulses are averaged to form a first received waveform. Next, multiple identical pulses are transmitted in a second direction and the received pulses are again averaged to form a second received waveform. Then, the first and second waveforms are cross-correlated. The peak of the cross-correlation data identifies a coarse measurement of the differential time of flight of the signal. Also, multiple sinusoidal signal pulses are transmitted in each direction and averaged, thereby creating third and fourth received waveforms. A first point is selected on the third waveform and first phase information is generated from a Fourier transform of the center frequency vector beginning at the first point. Then, a second point on the fourth waveform is determined by summing the first point and the coarse measurement. Second phase information is generated from a Fourier transform of the center frequency vector beginning at the second point. The second phase information is subtracted from the first phase information, and the difference is converted into a time value. That time value is added with the coarse measurement, thereby producing a precise differential time of flight measurement.

32 Claims, 1 Drawing Sheet

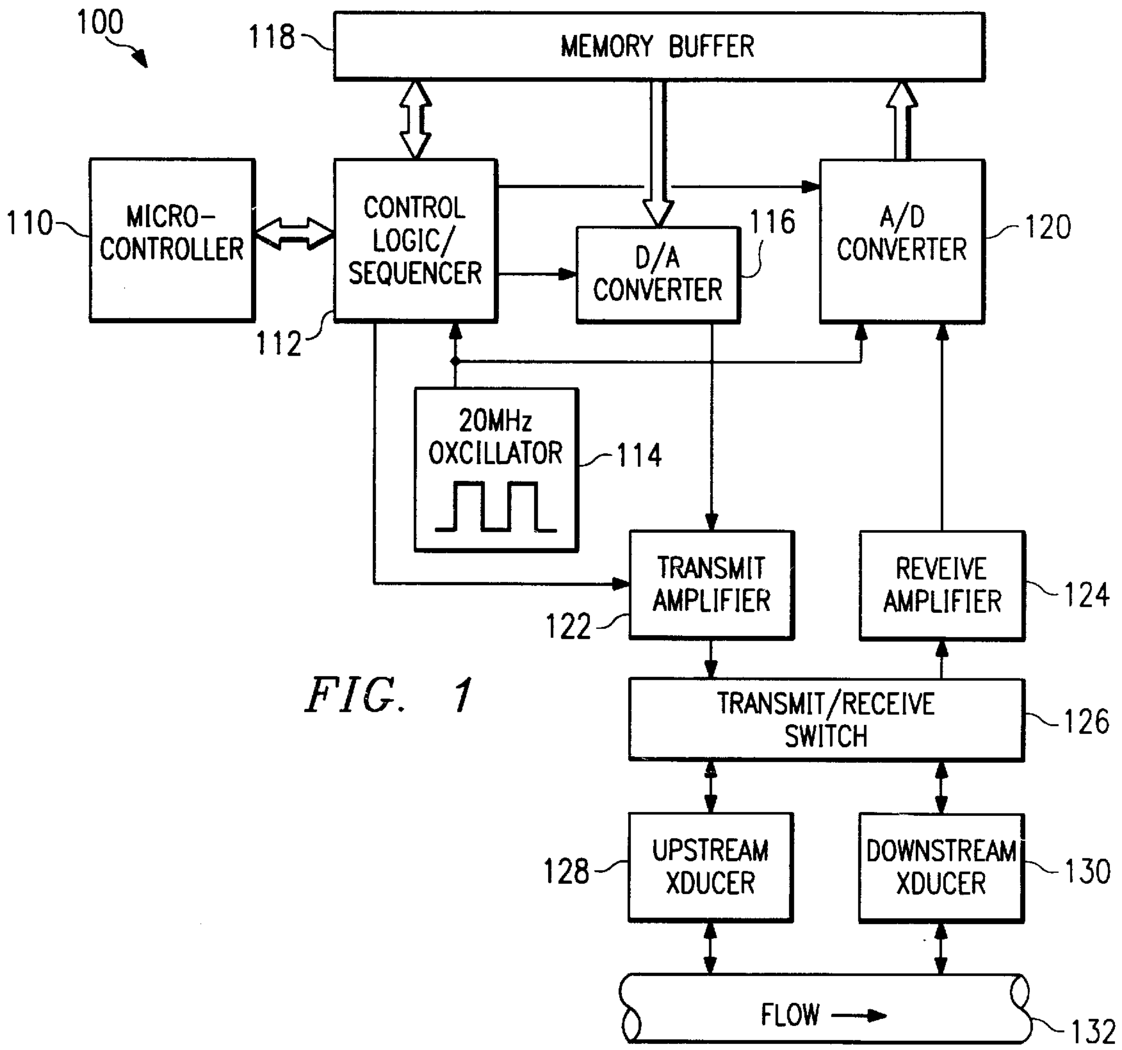
*FIG. 1*
*FIG. 2*
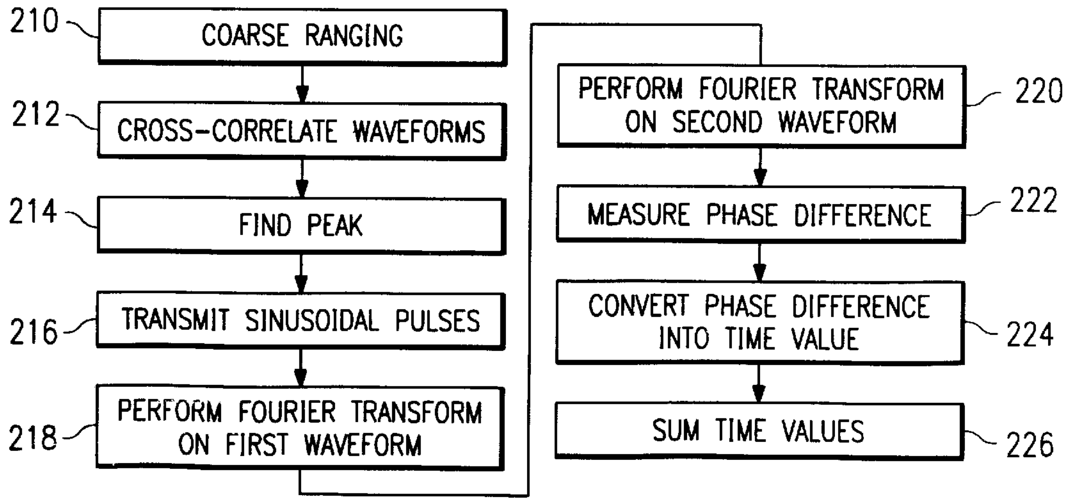

METHOD AND SYSTEM FOR HIGH RESOLUTION TIME-OF-FLIGHT MEASUREMENTS

TECHNICAL FIELD OF THE INVENTION

This invention pertains in general to signal processing and in particular to a method and system for precisely measuring differential time of flight.

BACKGROUND OF THE INVENTION

Often, it is necessary to measure the rate of fluid flow within a closed pipe. Non-invasive measurement methods are preferred because such methods do not detrimentally effect the fluid flow or pipe wall. There are two dominant methods of non-invasive flow rate measuring: "Doppler ultrasonic" and "Ultrasonic transit time." Both methods utilize the transmission of ultrasound through the pipe wall and into the fluid.

Doppler ultrasonic uses two ultrasonic transducers coupled to the pipe. The first transducer transmits a continuous ultrasonic signal through the pipe wall and into the fluid. Assuming the moving fluid contains bubbles and solids which can act as acoustic scattering sites, the second transducer receives scattered ultrasound signals. Then, the frequency of the scattered signal is compared with that of the transmitted signal. The frequency shift is proportional to the velocity of the scattering sites and, therefore, indicates the rate of fluid flow in the pipe. Doppler ultrasonic, however, cannot be used with pipes carrying perfectly clean fluids.

Ultrasonic transit time also relies on two ultrasonic transducers coupled to the pipe. The transducers transmit a sequence of counter-propagating pulses with and against the flow stream. By carefully measuring the total ultrasonic transit time, as well as minute differences between the upstream and downstream transits, the flow rate can be determined with great accuracy.

However, complex hardware is necessary to utilize ultrasonic transit time to measure flow rate with great precision. For example, typical pipe sizes and typical flow velocities require measurement accuracy and resolution of the arrival of the ultrasonic pulse to between 50–100 picoseconds ($50\text{–}100*10^{-12}$ seconds). In order to get a sufficient signal to noise ratio, prior art methods have required narrow front end bandwidths and very powerful transmitters. Moreover, these prior art methods required relatively expensive and large pulse transmission electronics and very sophisticated high power analog receiving schemes to determine pulse arrival with the necessary level of precision.

Digital systems for performing ultrasonic transit time measurement have also been devised. In such systems, multiple samples are transmitted and averaged. The inverse root of the number of samples roughly indicates the rate of improvement in the signal to noise ratio. However, the conversion speed of the analog to digital (A/D) converter is a lower bound of the achievable resolution in measuring time of arrival. While it is possible to use A/D converters with sufficient resolution for measuring pipe flow, such converters are generally too expensive, large, and powerful to use in portable industrial process control equipment.

Therefore, there is a need in the art for a method and system for measuring flow rates that allows precision in the picosecond range.

There is also a need in the art for a method and system for measuring flow rate that uses inexpensive and relatively portable hardware.

There is yet another need in the art for a method and system for measuring flow rate that works with perfectly clean fluids.

There is yet another need in the art for a method and system of measuring the time delay of a transmitted pulse with greater precision than the sampling rate of the A/D converter.

SUMMARY OF THE INVENTION

The above and other needs are met by a method and system for measuring flow rate that uses a two stage measurement method. First, a complex, broadband pulse having a low time domain ambiguity and a sharp auto-correlation function is generated. This pulse is transmitted multiple times in both the upstream and downstream directions and the received samples on each side are numerically averaged. A cross-correlation is performed on the averaged data, and the differential transit time is found by noting the location of the central peak of the correlation.

Second, a much longer sinusoidal pulse sequence with a center frequency of exactly 1.00 MHz is generated. This pulse has a flat auto-correlation, large time domain ambiguity, and very low frequency (and phase) ambiguity. This pulse is transmitted upstream and downstream and digitized and averaged in the same manner as the broadband pulse.

Next, a partial Fourier transform beginning at an arbitrary point is performed on one of the data sets generated from the second pulse. The scaler component of the center frequency vector is discarded, but the phase component is saved. Next, the other data set is shifted by an interval corresponding to the differential time of transit measured by the cross-correlation between the upstream and downstream signals. Then, an identical Fourier transformation is performed on the shifted data set and the phase component is retained.

One of the phase values is then subtracted from the other, thereby yielding a phase difference. The phase difference is converted to time and summed with the differential time measured with the cross-correlation between the upstream and downstream signals. This sum is the total differential transit time, measured to a resolution dependent upon the A/D converter resolution, the number of points in the transform, and only indirectly related to the sampling rate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a high level block diagram of a hardware implementation of the present invention; and FIG. 2 is a flow chart illustrated the steps performed in the present invention.

DESCRIPTION OF THE PREFERRED EMBODIMENTS

This discussion assumes a familiarity with common signal processing techniques. Those seeking background knowledge of the methods and techniques described herein are advised to consult B. Edde, *Radar*, PTR Prentice Hall, or M. Skolnik, Ed., *Radar Handbook* 2nd ed., McGraw-Hill Inc, chapter 10, which are both hereby incorporated by reference herein.

FIG. 1 illustrates a high level block diagram of a flow meter 100 according to the present invention. Micro-controller 110 and 20 MHz oscillator 114 are coupled to control logic/sequencer 112. Control logic/sequencer 112 is coupled to memory buffer 118.

Memory buffer 118 is coupled to digital to analog (D/A) converter 116. D/A converter 116 is also coupled to control logic/sequencer 112 and transmit amplifier 122. Transmit amplifier is also coupled to control logic/sequencer 112 and transmit/receive switch 126.

Transmit/receive switch 126 is coupled to upstream transducer 128 and downstream transducer 130. The transducers 128, 130 are coupled to pipe 132. Transmit/receive switch 126 is also coupled to receive amplifier 124.

Receive amplifier 124 is coupled to analog to digital (A/D) converter 120. A/D converter 120 is also coupled to oscillator 114, control logic/sequencer 112, and memory buffer 118.

Micro-controller 110 is preferably a general purpose central processing unit (CPU), such as an x86 compatible CPU. Software executing on micro-controller 110 uses direct digital synthesis to generate the waveform to be transmitted and stores it, via control logic/sequencer 112, in a first storage location within memory buffer 118. The software can dynamically change the waveform depending on the needs of flow rate meter 100.

Control logic/sequencer 112 acts as a general logic controller for flow rate meter 100. In addition, control logic/sequencer 112 generates timing windows and causes memory buffer 118 to output the waveform stored at the first storage location to D/A converter 116. D/A converter 116 generates an analog voltage corresponding to the digital data words of the stored waveform. Preferably, D/A converter 116 receives 8-bit binary numbers corresponding to instantaneous voltage levels at 50 nS intervals. This voltage is transferred to transmit amplifier 122 which amplifies the signal.

The amplified signal is then passed to transmit/receive switch 126, which, in turn, passes the amplified signal to either upstream transducer 128 or downstream transducer 130. The transducers 128, 130 are preferably ultrasonic and can be directly coupled to pipe 132 or, if desired, directly coupled to the fluid within the pipe. In use, one transducer emits the amplified signal and the other transducer receives the signal.

The received signal is passed back to transmit/receive switch 126 via the receiving transducer. Next, the received signal is transferred to receive amplifier 124 for amplification. Then, the amplified received signal is passed to A/D converter 120. A/D converter 120 converts the analog received signal into 8-bit binary words representing the received instantaneous voltage at 50 nS intervals. Then, the binary words are stored within a second storage location within memory buffer 18 for subsequent analysis by micro-controller 110.

Note that oscillator 114 provides the time base for flow meter 100 and synchronizes D/A converter 116 and A/D converter 120. Thus, the transmitted and received data are phase-locked. Of course, a different frequency oscillator can be used when necessary or desired.

Also note that most of the components within flow meter 100 can be implemented within a general purpose computer system. Thus, micro-controller 110, control logic/sequencer 112, and memory buffer 118 can all be within the computer system. The remaining hardware can be located on a peripheral card or cards coupled to the computer system. The hardware is controlled by software executing on micro-controller 110 and stored in memory buffer 118 or a permanent storage device such as a hard disk (not shown) as is well known in the art.

Of course, one skilled in the art will recognize that the hardware illustrated in FIG. 1 is merely one way to implement the method discussed below. Alternate hardware embodiments are readily apparent and are clearly within the scope of the present invention.

FIG. 2 illustrates a flow chart of the method of measuring flow rate according to the present invention. The first step 210 is to perform coarse ranging. At step 210, multiple broadband pulses are transmitted upstream and downstream by the upstream and downstream transducers 128, 130. That is, multiple pulses are transmitted from upstream transducer 128 and received by downstream transducer 130. Then, multiple pulses are transmitted from downstream transducer 130 to upstream transducer 128.

The receiving transducer is configured to sample at a rate of 20 MHz, commencing after a preprogrammed delay and lasting for a predetermined time window. Since the noise from transmission to transmission is non-correlated, the noise tends toward zero when the multiple samples are averaged. Accordingly, the downstream pulses are averaged to form a downstream waveform and the upstream pulses are averaged to form an upstream waveform. Then, the downstream and upstream waveforms are stored within memory buffer 118.

The pulses transmitted at step 210 are preferably up-chirps. That is, the frequency of the pulse sweeps from low to high. A preferred embodiment of the pulse is a waveform packet consisting of 1000 bytes of data shaped to form a square wave modulated FM up-chirp with a bandwidth of 400 kHz beginning at 1 MHz. This up-chirp is preferred because such pulses have a sharp auto-correlation function and yield a sharp cross-correlation after the effects of transmitting and receiving. Other types of pulses, such as non-linear FM pulses are well known in the art and can be used as necessary. The pulse, however, should be relatively short and have a low time domain ambiguity.

Next, at step 212, the upstream and downstream waveforms are cross-correlated and a data set is generated therefrom. At step 214, the peak of the cross-correlation function is determined from the data set. The location of the peak of the cross-correlation function indicates the coarse time differential or coarse time value associated with the upstream and downstream waveforms. Since both waveforms were generated from a waveform having a sharp auto-correlation function, the cross-correlation of the waveforms is also sharp. Therefore, the peak can be determined within one or two sampling intervals.

The location of the peak is proportional to the difference between the transmission times of the upstream and downstream pulses. Since flow meter 100 uses a 20 MHz oscillator, the points in the data set are separated by 50 nanoseconds (nS). Therefore, the peak, and the corresponding transmission time difference, can be determined to within 100 nS. As will be shown below, an error of up to 250 nS is acceptable.

After the transmission time difference is determined, flow meter 100 transmits a series of long, continuous sinusoidal pulses (step 216). The sinusoidal pulses are transmitted, sampled, averaged, and stored in both directions in an identical manner to the broadband pulses discussed with respect to step 210.

The sinusoidal pulses preferably have a frequency located at the center of the band utilized by flow meter 100. In a preferred embodiment, this frequency is exactly 1 MHz. Since the pulses are relatively long, the pulses have a low frequency ambiguity and, correspondingly, a high phase resolution.

Once the upstream and downstream sinusoidal waveforms are stored in the memory buffer, an arbitrary point in one of the waveforms is selected. Then, a direct Fourier transform for the center frequency vector (1 MHz) is performed on the waveform beginning at the arbitrary point (step 218). The scalar component of the center frequency vector is discarded, but the phase information is saved as a first phase value.

Next, the point corresponding to the sum of the selected arbitrary point and the time differential measured by the coarse ranging at step 214 is found on the other stored waveform. Then, a second direct Fourier transform for the center frequency vector beginning at this point is performed on this waveform (step 220). Once again, the scalar component of the center frequency vector is discarded, but the phase information is saved as a second phase value.

At step 222, a phase difference between the two phase values is measured by subtracting the second phase value from the first phase value. Then, at step 224, the phase difference value is converted back into a time value. At step 226, this time value is summed with the transmission time difference determined by the coarse ranging at step 214. This sum is the total differential transit time, measured to a resolution dependent upon the A/D converter resolution and the number of points in the Fourier transform.

Once the total differential transit time is determined, the time can be used with well known techniques to precisely determine the flow rate within pipe 132. In addition, the method described above can be used in many different signal processing fields, such as radar, where precise differential time of flight measurements are required. Furthermore, the required hardware is relatively common and can be obtained at a low cost.

Although the present invention and its advantages have been described in detail, it should be understood that various changes, substitutions and alterations can be made herein without departing from the spirit and scope of the invention as defined by the appended claims.

What is claimed is:

1. A method of measuring a differential time of flight of a signal traveling between a first transducer and a second transducer, comprising the steps of:

transmitting a pulse having a first waveform from the first transducer to the second transducer;

transmitting a pulse having the first waveform from the second transducer to the first transducer;

determining a coarse time differential by cross-correlating the pulse received by the second transducer with the pulse received by the first transducer;

transmitting a pulse having a second waveform from the first transducer to the second transducer;

transmitting a pulse having the second waveform from the second transducer to the first transducer;

calculating a first phase value for the second pulse received by the second transducer;

calculating a second phase value from the coarse time differential and the second pulse received by the first transducer;

calculating a precise time differential from the first and second phase values; and calculating a differential time of flight from the coarse time differential and the precise time differential.

2. The method of claim 1, wherein each transmitting step transmits a plurality of pulses and each transmitting step further comprises the step of:

averaging the plurality of pulses to produce an averaged pulse; and wherein the determining and calculating steps use the averaged pulse.

3. The method of claim 1, wherein the pulses are ultrasound pulses.

4. The method of claim 1, wherein the first waveform is a broadband waveform having a low time domain ambiguity.

5. The method of claim 4, wherein the first waveform is an up-chirp.

6. The method of claim 5, wherein the first waveform is a square wave modulated FM up-chirp having a bandwidth of 400 KHz beginning at 1 MHz.

7. The method of claim 1, wherein the first and second waveforms are generated using direct digital synthesis.

8. The method of claim 1, wherein the second waveform has a low frequency domain ambiguity.

9. The method of claim 8, wherein the second waveform is a sinusoidal wave.

10. The method of claim 9, wherein the second waveform has a frequency of 1 MHz.

11. The method of claim 1, wherein the determining step comprises the steps of:

producing a data set from the cross-correlation;

analyzing the data set to find a location of a correlation peak; and calculating the coarse time differential from the location of the correlation peak.

12. The method of claim 1, wherein the step of calculating the precise time differential comprises the steps of:

subtracting the second phase value from the first phase value to produce a phase difference; and converting the phase difference into the precise time differential.

13. The method of claim 1, wherein the step of calculating the differential time of flight comprises the step of:

summing the coarse time differential and the precise time differential.

14. The method of claim 1, wherein in the step of calculating the first phase value comprises the steps of:

picking an arbitrary starting point in the second pulse received by the second transducer;

calculating a first Fourier transform for a center frequency vector of the second pulse received by the second transducer beginning at the arbitrary point; and determining the first phase value from the first Fourier transform.

15. The method of claim 14, wherein the step of calculating the second phase value comprises the steps of:

summing the arbitrary point and the coarse time differential to produce a starting point;

calculating a second Fourier transform for the center frequency vector of the second pulse received by the first transducer beginning at the starting point;

determining the second phase value from the second Fourier transform.

16. A method of measuring a differential time of transit of a pulse transmitted between an upstream transducer and a downstream transducer, comprising the steps of:

emitting a plurality of broadband pulses between the upstream transducer and the downstream transducer, wherein the pulses emitted by the upstream transducer are received by the downstream transducer and the pulses emitted by the downstream transducer are received by the upstream transducer;

averaging the broadband pulses received by the downstream transducer to produce a downstream waveform;

averaging the broadband pulses received by the upstream transducer to produce an upstream waveform;

cross-correlating the downstream and upstream waveforms to produce a coarse time differential value;

emitting a plurality of sinusoidal pulses between the upstream transducer and the downstream transducer, wherein the pulses emitted by the upstream transducer are received by the downstream transducer and the pulses emitted by downstream transducer are received by the upstream transducer;

averaging the sinusoidal pulses received by the downstream transducer to produce a downstream sinusoidal waveform;

averaging the sinusoidal pulses received by the upstream transducer to produce an upstream sinusoidal waveform;

performing a Fourier transform on the downstream sinusoidal waveform to produce first phase information; and performing a Fourier transform on the upstream sinusoidal waveform to produce second phase information;

calculating a differential time of transit from the first and second phase information and the coarse time differential value.

17. The method of claim 16, wherein each broadband pulse comprises a square wave modulated FM up-chirp.

18. The method of claim 16, wherein the cross-correlating step comprises the steps of:

generating a data set from the cross-correlation;

analyzing the data set to find a cross-correlation peak; and calculating the coarse time differential value from the cross-correlation peak.

19. The method of claim 16, wherein the step of performing a Fourier transform on the downstream waveform comprises the steps of:

selecting a starting point on the downstream waveform; and wherein the Fourier transform begins at the starting point.

20. The method of claim 16, wherein the step of performing a Fourier transform on the upstream waveform comprises the steps of:

summing the starting point and the coarse time differential value to produce a begin point; and wherein the Fourier transform begins at the begin point.

21. The method of claim 16, wherein the calculating step comprises the steps of:

subtracting the second phase information from the first phase information to produce a phase difference;

converting the phase difference into a precise time differential value; and summing the coarse time differential value with the precise time differential value.

22. A method of precisely measuring a differential time of flight between first and second transducers, comprising the steps of:

transmitting a pulse from the first transducer to the second transducer to produce a first waveform;

transmitting the pulse from the second transducer to the first transducer to produce a second waveform;

calculating first phase information from the first waveform and second phase information from the second waveform; and determining the differential time of flight from the first phase information and the second phase information, wherein the determining step comprises the steps of:

subtracting the first phase information from the second phase information to produce a phase difference;

converting the phase difference into a time value; and summing the time value with a previously determined coarse time value.

23. The method of claim 22, wherein each transmitting step transmits a plurality of pulses, the method further comprising the steps of:

averaging the plurality of pulses from the first transducer to the second transducer to produce the first waveform; and averaging the plurality of pulses from the second transducer to the first transducer to produce the second waveform.

24. The method of claim 22, wherein the calculating step further comprises the steps of:

selecting an arbitrary point on the first waveform;

performing a Fourier transform of a center frequency vector of the first waveform starting from the arbitrary point;

summing the arbitrary point and a coarse differentiation value to determine a point on the second waveform; and performing a Fourier transform of the center frequency vector of the second waveform starting at the determined point.

25. The method of claim 22, further including the steps of:

transmitting a broadband pulse from the first transducer to the second transducer to produce a first broadband waveform;

transmitting the broadband pulse from the second transducer to the first transducer to produce a second broadband waveform;

generating a coarse differential time from the first and second broadband waveforms; and wherein the calculating and determining steps use the coarse differential time.

26. The method of claim 22, wherein the pulse is a sinusoidal pulse.

27. A flow meter for measuring the flow of fluid through a pipe, the flow meter comprising:

first and second transducers coupled to the pipe in sonic communication with the fluid;

means for transmitting a first pulse from the first transducer;

means for receiving the first pulse by the second transducer and generating a first waveform therefrom;

means for transmitting a second pulse from the second transducer;

means for receiving the second pulse by the first transducer and generating a second waveform therefrom;

means for transmitting a third pulse from the first transducer;

means for receiving the third pulse by the second transducer and generating a third waveform therefrom;

means for transmitting a fourth pulse from the second transducer;

means for receiving the fourth pulse by the first transducer and generating a fourth waveform therefrom;

means for generating a coarse time differential from the first and second waveforms; and means for generating a precise time differential from the coarse time differential, the third waveform, and the fourth waveform.

28. The flow meter of claim 27, wherein the first and second pulses are broadband pulses having a low time domain ambiguity and the third and fourth pulses are sinusoidal pulses having a low phase domain ambiguity.

29. The flow meter of claim 27, wherein the means for generating a precise time differential comprises:

means for performing a Fourier transform of the third waveform and generating first phase information therefrom; and means for performing a Fourier transform of the fourth waveform beginning at a point determined by the coarse time differential and generating second phase information therefrom;

means for calculating the precise time differential from the first and second phase information.

30. A computer program product having a computer readable medium having computer program logic recorded thereon for measuring a differential time of flight between a first transducer and a second transducer in a computer system having a processor and a memory, the computer program product comprising:

means for transmitting a first pulse between the transducers in a first direction and a second direction to produce first and second waveforms stored in the memory;

means for calculating a coarse differential transit time from the first and second waveforms;

means for transmitting a second pulse between the transducers in a first direction and a second direction to produce third and fourth waveforms stored in the memory, wherein a period of the third and fourth waveforms is less than the coarse differential transit time;

means for calculating a phase difference between the third and fourth waveforms; and means for calculating a precise differential transit time from the phase difference and the coarse differential transit time.

31. The computer program product of claim 30, wherein the first pulse is a broadband pulse.

32. The computer program product of claim 30, wherein the second pulse is a sinusoidal pulse.

* * * * *